(12) United States Patent
Scoda (10) Patent No.: US 8,984,164 B2
(45) Date of Patent: *Mar. 17, 2015

(54) METHODS FOR REDUCING LATENCY IN NETWORK CONNECTIONS AND SYSTEMS THEREOF

(75) Inventor: Enrico Scoda, Martignacco (IT)

(73) Assignee: Usablenet Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/927,169

(22) Filed: Nov. 9, 2010

(65) Prior Publication Data

US 2012/0117253 A1 May 10, 2012

(51) Int. Cl.
*G06F 15/16* (2006.01)
*H04L 29/08* (2006.01)

(52) U.S. Cl.
CPC ............ *H04L 67/2814* (2013.01); *H04L 67/02* (2013.01)
USPC ............................ 709/245; 709/227; 709/228

(58) Field of Classification Search
None
See application file for complete search history.

(56) References Cited

U.S. PATENT DOCUMENTS

| | | | |
|---|---|---|---|
| 6,992,983 B1 | 1/2006 | Chatterjee | |
| 2002/0023159 A1* | 2/2002 | Vange et al. | 709/228 |
| 2004/0073867 A1* | 4/2004 | Kausik et al. | 715/500 |
| 2004/0215717 A1 | 10/2004 | Seifert et al. | |
| 2005/0060410 A1 | 3/2005 | Wu et al. | |
| 2006/0021004 A1* | 1/2006 | Moran et al. | 726/2 |
| 2006/0294223 A1* | 12/2006 | Glasgow et al. | 709/224 |
| 2007/0073878 A1* | 3/2007 | Issa | 709/225 |
| 2007/0174193 A1* | 7/2007 | Quan et al. | 705/44 |
| 2008/0172488 A1* | 7/2008 | Jawahar et al. | 709/225 |
| 2008/0195696 A1 | 8/2008 | Boutroux et al. | |
| 2008/0270223 A1* | 10/2008 | Collins et al. | 705/10 |
| 2008/0288458 A1* | 11/2008 | Sun et al. | 707/3 |
| 2008/0307517 A1* | 12/2008 | Grigoriev et al. | 726/9 |
| 2009/0077205 A1* | 3/2009 | Quinet et al. | 709/219 |
| 2009/0193129 A1 | 7/2009 | Agarwal et al. | |
| 2010/0131639 A1* | 5/2010 | Narayana et al. | 709/224 |
| 2010/0132031 A1* | 5/2010 | Zheng | 726/13 |
| 2010/0198911 A1* | 8/2010 | Zhang et al. | 709/203 |
| 2010/0223355 A1 | 9/2010 | Yang et al. | |
| 2010/0242092 A1* | 9/2010 | Harris et al. | 726/3 |
| 2010/0319056 A1* | 12/2010 | Gillum et al. | 726/5 |
| 2012/0036178 A1* | 2/2012 | Gavini et al. | 709/203 |

OTHER PUBLICATIONS

International Search Report for International Patent Application No. PCT/US2011/059994, (Jun. 29, 2012).
Supplementary European Search Report for corresponding EP 11839018.6 (Mar. 7, 2014).
Supplementary European Search Report for corresponding EP 11840003.5 (Mar. 7, 2014).

* cited by examiner

*Primary Examiner* — Ranodhi Serrao
(74) *Attorney, Agent, or Firm* — LeClairRyan, a Professional Corporation (57) ABSTRACT

A method, computer readable medium, and apparatus for reducing latency in network connections include receiving at a proxy server device a first response from one or more server devices in response to a first request from a client device for a network resource stored on the one or more server devices. The proxy server device determines whether or not the first response is a redirect message, and sends a second request to the one or more server devices when the first response includes the first redirect message, such that the sending is performed at least partially based upon the received redirect message.

12 Claims, 4 Drawing Sheets

METHODS FOR REDUCING LATENCY IN NETWORK CONNECTIONS AND SYSTEMS THEREOF

FIELD

The embodiments of the present invention generally relate to proxy server devices and, more particularly, to methods for reducing latency in network connections utilizing proxy server devices, and systems thereof.

BACKGROUND

When a client device connects to a server (e.g., a web server, or a content server) to get a network resource using a network protocol, e.g., the Hyper-text Transfer protocol (HTTP), the server responds by sending the network resource or by sending a redirect message back to the client device over a communication channel. If the client device receives a redirect message, it will need to send a new request to the server based upon the redirect message, and the server will again respond with a redirect or a real resource. This communication process between the client device and the server repeats until the client device is able to get the resource, if available.

However, when the client device, e.g., a cell phone using a radio network, or a computer having a slow Internet connection, requests a network resource and has to perform more than one redirects to obtain the network resource, the client device will experience substantial delay and will spend a considerable amount of time to execute the whole process before finally being provided with the network resource. The delay can occur, for example, because of a large time to establish a connection and send the HTTP request, also referred to as latency time of radio networks or other slow network connections (e.g., Internet via a dial-up connection). Unfortunately, this delay can often lead to the client device not being able to obtain the network resource at all, or the client device giving up or relinquishing attempts to obtain the network resource under time constraints.

One conventional solution built to obtain faster HTTP responses for slow connection networks utilizes one or more proxy server devices (e.g., web proxy servers). Another conventional solution utilizes telephone carrier data centers that handle the network traffic for each client device by handling one or more requests when the client device is a mobile telephone, or a mobile personal digital assistant (PDA) device, for example. Unfortunately, the above-noted conventional solutions do not resolve the redirection problem associated with network resources stored on the servers since the redirect messages are forwarded on to the client devices for handling resulting in multiple back and forth communication between the client devices and the servers.

SUMMARY

A method for reducing latency in network connections includes receiving at a proxy server device a first response from one or more server devices in response to a first request from a client device for a network resource stored on the one or more server devices. The proxy server device determines whether or not the first response is a redirect message, and sends a second request to the one or more server devices when the first response includes the first redirect message, such that the sending is performed at least partially based upon the received redirect message.

A computer readable medium having stored thereon instructions for reducing latency in network connections comprising machine executable code which when executed by at least one processor, cause the processor to perform steps including receiving at a proxy server device a first response from one or more server devices in response to a first request from a client device for a network resource stored on the one or more server devices. The steps include determining at the proxy server device whether or not the first response is a redirect message, and sending a second request from the proxy server device to the one or more server devices when the first response includes the first redirect message, such that the sending is performed at least partially based upon the received redirect message.

An apparatus configured to reduce latency includes one or more processors and a memory coupled to the one or more processors which are configured to execute programmed instructions stored in the memory including instructions to implement receiving at a proxy server device a first response from one or more server devices in response to a first request from a client device for a network resource stored on the one or more server devices. The instructions include instructions for determining at the proxy server device whether or not the first response is a redirect message, and sending a second request from the proxy server device to the one or more server devices when the first response includes the first redirect message, such that the sending is performed at least partially based upon the received redirect message.

This technology provides a number of advantages including providing a method, computer readable medium and an apparatus that adds an exemplary redirect module to the proxy server devices to efficiently manage the whole redirect chain returning only the last redirect message to the client device, which client device can then obtain the requested network resource from the server on which the network resource is stored, without exchanging multiple intermediate redirect messages back and forth with the server. In one exemplary scenario, cookies received by the proxy server device from the content servers are collected and forwarded to the client device. Accordingly, this technology provides substantial reduction in latency of network connections because the number of redirect messages between the client devices and the content/resource servers is reduced, and takes advantage of the high speed and high bandwidth communication infrastructure between the proxy server device(s) and the server devices on which content is stored.

DETAILED DESCRIPTION

Figure 1:
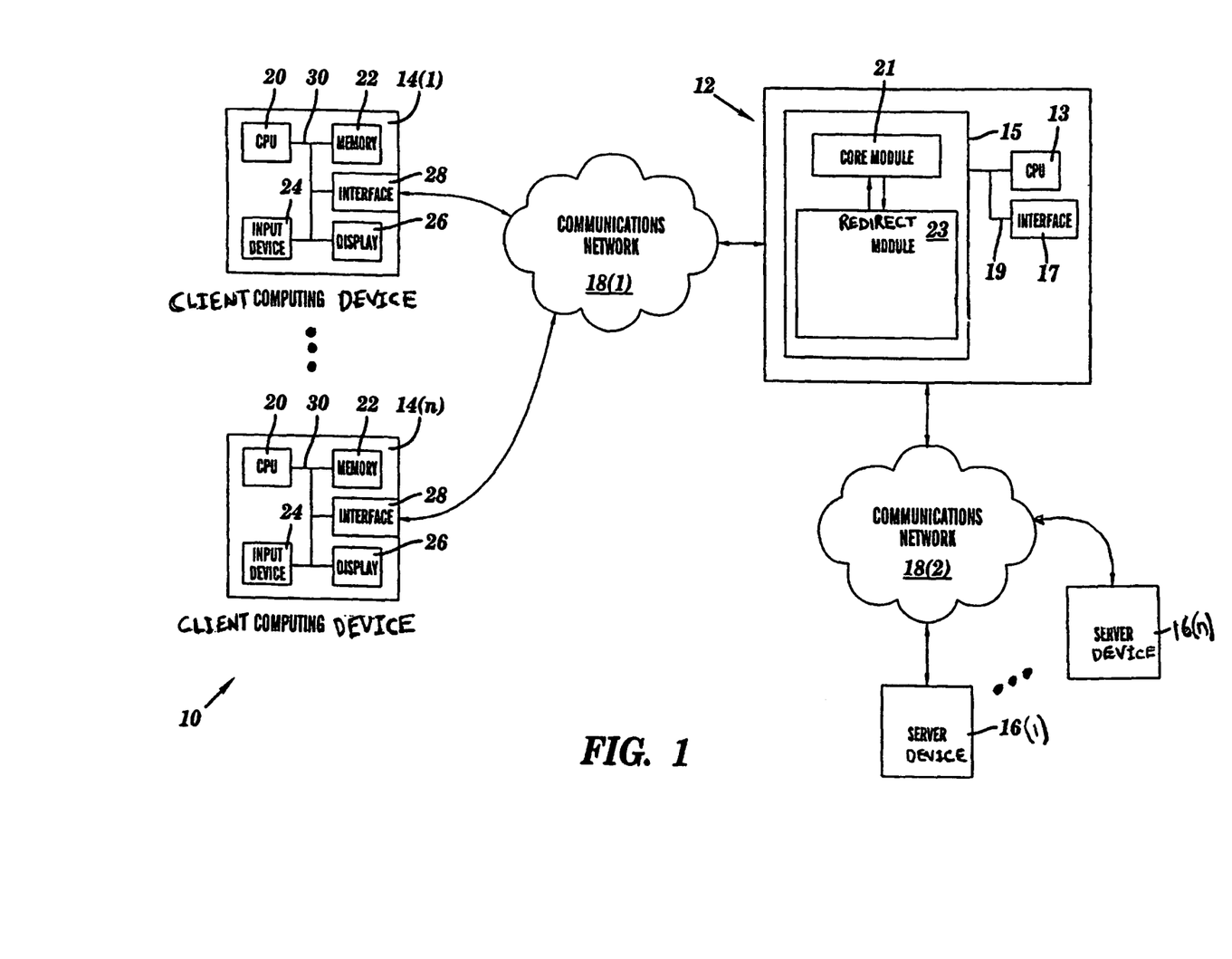
FIG. 1 is a block diagram of an exemplary network environment with a proxy server device interposed between client devices and server devices.

An exemplary environment 10 in which a proxy server device 12 is optimized for reducing latency in network connections is illustrated in FIG. 1. By way of example only, proxy server device 12 can be a web content proxy server, or other types of proxy servers well known to those of ordinary skill in the art. The exemplary environment 10 includes the proxy server device or apparatus 12, client devices 14(1)-14(n), server devices 16(1)-16(n), and communication networks 18(1)-18(2), although other numbers and types of systems, devices, and/or elements in other configurations and environments with other communication network topologies can be used. This technology provides a number of advantages including providing a method, computer readable medium, and an apparatus that reduces latency in network connections, for example, HTTP connections.

Referring more specifically to FIG. 1, the proxy server device 12 manages handling of redirect messages or redirection responses from the server devices 16(1)-16(n) for and/or on behalf of requesting client devices 14(1)-14(n) and provides updated cookie information to the client devices 14(1)-14(n) for future requests for network resources from the client devices 14(1)-14(n), although the proxy server device 12 can provide other numbers and types of functions. Although one proxy server device 12 is shown, other numbers and types of web content proxy devices and systems can be used. By way of example only, according to one embodiment of the present invention, proxy server device 12 can be a carrier gateway device communicating with one or more content servers, e.g., server devices 16(1)-16(n), for managing network resource requests from client devices 14(1)-14(n). Further by way of example only, the proxy server device 12 can be an HTTP proxy server or a carrier gateway configured to reduce latency in network connections by receiving a first response from one or more server devices 16(1)-16(n) in response to a first request from a client device for a network resource stored on the one or more server devices 16(1)-16(n). Proxy server device 12 determines whether or not the first response is a redirect message, and sends a second request to the one or more server devices 16(1)-16(n) when the first response includes the first redirect message, such that the sending is performed at least partially based upon the received redirect message.

The proxy server device 12 includes a central processing unit (CPU) or processor 13, a memory 15, and an interface system 17 which are coupled together by a bus 19 or other link, although other numbers and types of components, parts, devices, systems, and elements in other configurations and locations can be used. The processor 13 in the proxy server device 12 executes a program of stored instructions to carry out or perform one or more aspects of the present invention as described and illustrated by way of the embodiments herein, although the processor could execute other numbers and types of programmed instructions.

The memory 15 in the proxy server device 12 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 13, can be used for the memory 15 in the proxy server device 12. In these embodiments, the memory 15 includes a core module 21 and a redirect module 23 which store programmed instructions for one or more aspects of the present invention as described and illustrated herein, although the memory can comprise other types and numbers of systems, devices, and elements in other configurations which store other data. As discussed in more detail below in FIG. 3, only the last network location (e.g., a Uniform Resource Identifier or URI) of a redirect chain 300 is forwarded by redirect module 23 to the requesting client device among client devices 14(1)-14(n), although the redirect module 23 can have other types and numbers of functions as described and illustrated herein.

The interface system 17 in the proxy server device 12 is used to operatively couple and communicate between the proxy server device 12 and the client devices 14(1)-14(n) and the server devices 16(1)-16(n) via the communication networks 18(1) and 18(2), although other types and numbers of communication networks with other types and numbers of connections and configurations can be used. By way of example only, the communication networks 18(1) and 18(2) can use TCP/IP over Ethernet and industry-standard protocols, including HTTP, HTTPS, WAP, and SOAP, although other types and numbers of communication networks, such as a direct connection, a local area network, a wide area network, modems and phone lines, e-mail, and wireless and hardwire communication technology, each having their own communications protocols, can be used. In one exemplary embodiment, one of communication networks 18(1) and 18(2) can be operating over one or more low-speed connections (e.g., a dial-up connection) while the other one of the communication networks 18(1) and 18(2) can be operating over a high speed, high bandwidth connection (e.g., optical fiber based communication network). In yet another exemplary embodiment, one or more of communication networks 18(1) and 18(2) can be a radio network, a satellite network, an Internet connection, a wired cable network, or combinations thereof, well known to one of ordinary skill in the art reading this disclosure.

Each of the client devices 14(1)-14(n) enables a user to request, obtain, and interact with one or more network resources, e.g., web pages from one or more web sites, hosted by server devices 16(1)-16(n) through the proxy server device 12 via one or more communication networks (e.g., communication network 18(1)), although one or more of the client devices 14(1)-14(n) could access content and utilize other types and numbers of applications from other sources and could provide a wide variety of other functions for the user. Although multiple client devices 14(1)-14(n) are shown, other numbers and types of user computing systems could be used. In one example, the client devices 14(1)-14(n) comprise mobile devices with Internet access that permit a website form page or other retrieved data that is a part of a requested network resource to be displayed, although each of the client devices 14(1)-14(n) can connect to server devices 16(1)-16 (n) via other types of network connections directly or indirectly, depending upon specific scenarios, as can be contemplated by one of ordinary skill in the art, after reading this disclosure. By way of example only, one or more of the client devices 14(1)-14(n) can comprise smart phones, personal digital assistants, computers, or other computing devices.

Each of client devices 14(1)-14(n) in this example is a computing device that includes a central processing unit (CPU) or processor 20, a memory 22, user input device 24, a display 26, and an interface system 28, and which are coupled together by a bus 30 or other link, although one or more of client devices 14(1)-14(n) can include other numbers and types of components, parts, devices, systems, and elements in other configurations. The processor 20 in each of client devices 14(1)-14(n) executes a program of stored instructions for aiding one or more aspects of the present invention as described and illustrated herein, although the processor could execute other numbers and types of programmed instructions.

The memory 22 in each of the client devices 14(1)-14(n) stores these programmed instructions for one or more aspects of the present invention as described and illustrated herein as well as updated cookies associated with a network resource and received as part of one or more redirect chains forwarded by proxy server device 12, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to processor 20 can be used for the memory 22 in each of the client devices 14(1)-14(n).

The user input device 24 in each of the client devices 14(1)-14(n) is used to input selections, such as requests for a network resource, e.g., a particular website form page or to enter data in fields of a form page, although the user input device could be used to input other types of data and interact with other elements of exemplary environment 10. The user input device 24 can include keypads, touch screens, and/or vocal input processing systems, although other types and numbers of user input devices can be used.

The display 26 in each of the client devices 14(1)-14(n) is used to show data and information to the user, such as website page by way of example only. The display in each of the client devices 14(1)-14(n) is a mobile phone screen display, although other types and numbers of displays could be used depending on the particular type of client device, as can be contemplated by one of ordinary skill in the art, after reading this disclosure.

The interface system 28 in each of the client devices 14(1)-14(n) is used to operatively couple and communicate between the client devices 14(1)-14(n) and the proxy server device 12 and server devices 16(1)-16(n) over the communication networks 18(1) and 18(2), although other types and numbers of communication networks with other types and numbers of connections and configurations can be used.

The server devices 16(1)-16(n) provide one or more pages from one or more web sites for use by one or more of the client devices 14(1)-14(n) via the proxy server device 12, although the server devices 16(1)-16(n) can provide other numbers and types of applications and/or content and can have provide other numbers and types of functions. Although server devices 16(1)-16(n) are shown for ease of illustration and discussion, other numbers and types of server systems, for example, web servers, and devices can be used. In one example, server devices 16(1)-16(n) can be web servers having dedicated hardware with software executing on the dedicated hardware to facilitate the proxy server device 12 and client devices 14(1)-14(n) in their functioning. In another example, server devices 16(1)-16(n) can be content servers that are configured to deliver network resources stored thereupon using the HTTP protocol, or other network protocols for example. Content stored on server devices 16(1)-16(n) that can be part of the network resources requested by client devices 14(1)-14(n) can be web pages, electronic files and documents, configuration data, metadata, or other network data and files, by way of example only and not by way of limitation.

Each of the server devices 16(1)-16(n) include a central processing unit (CPU) or processor, a memory, and an interface system which are coupled together by a bus or other link, although each of the server devices 16(1)-16(n) could have other numbers and types of components, parts, devices, systems, and elements in other configurations and locations can be used. The processor in each of the server devices 16(1)-16(n) executes a program of stored instructions one or more aspects of the present invention as described and illustrated by way of the embodiments herein, although the processor could execute other numbers and types of programmed instructions. When one of the server devices 16(1)-16(n) does not store the requested content, the server device may respond by sending a redirect message to the proxy server device 12, which the proxy server device 12 sends to the appropriate server device indicated by the redirect message instead of forwarding the redirect message back to the requesting one of the client devices 14(1)-14(n).

The memory in each of the server devices 16(1)-16(n) stores these programmed instructions for one or more aspects of the present invention as described and illustrated by way of the embodiments, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in each of the server devices 16(1)-16(n).

The interface system in each of the server devices 16(1)-16(n) is used to operatively couple and communicate between the server devices 16(1)-16(n) and the proxy server device 12 and the client devices 14(1)-14(n) via communication networks 18(1) and 18(2), although other types and numbers of communication networks with other types and numbers of connections and configurations can be used.

Although embodiments of the proxy server device 12, the client devices 14(1)-14(n), and the server devices 16(1)-16(n), are described and illustrated herein, each of the client devices 14(1)-14(n), the proxy server device 12, and the server devices 16(1)-16(n), can be implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently implemented using one or more general purpose computer systems having computer readable medium, microprocessors, digital signal processors, and micro-controllers, programmed according to the teachings of the embodiments, as described and illustrated herein, and as will be appreciated by those ordinary skill in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 2:
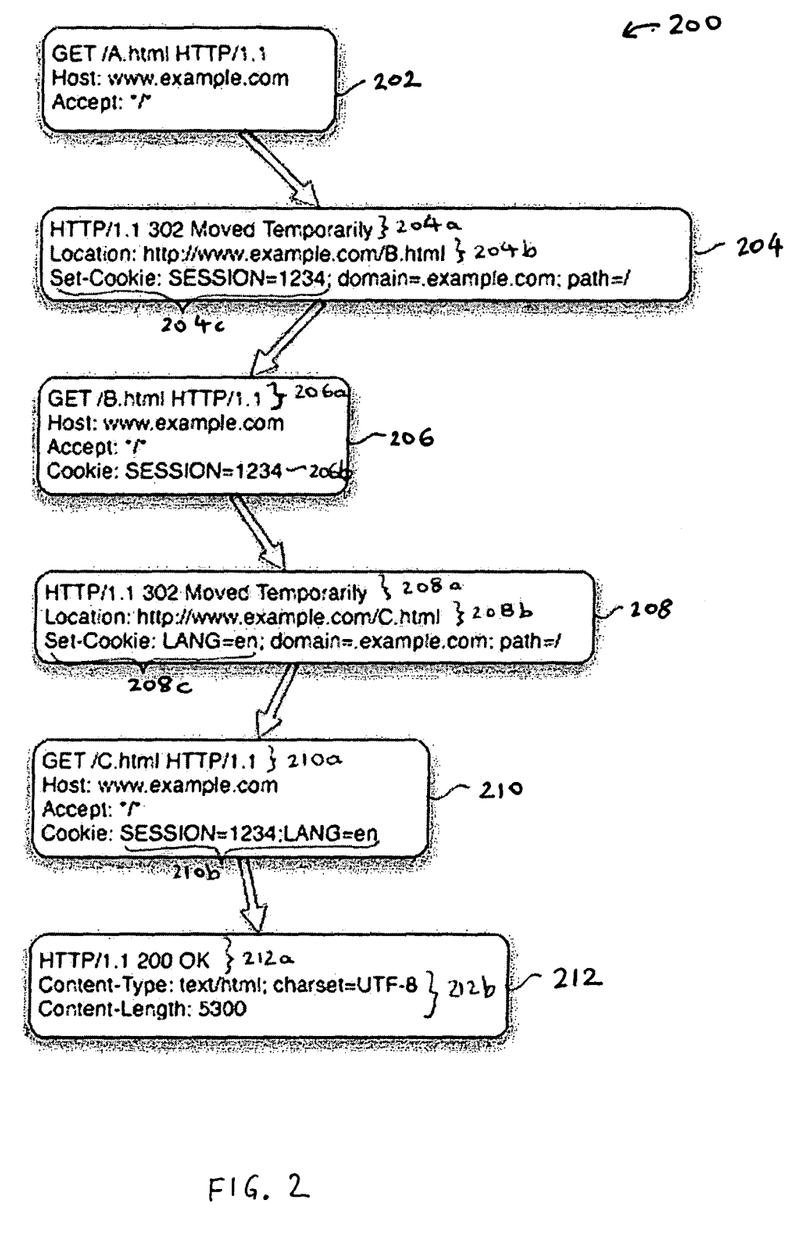
FIG. 2 is an example of a redirect response message chain exchanged between the client devices and the server devices of FIG. 1, as handled by a conventional proxy server device.

Referring to FIG. 2, an exemplary redirect chain 200 is illustrated for a conventional scenario where proxy server device 12 is not configured to automatically handle redirect messages. It is to be noted that the sequence of steps for handling redirect chain 200 is only exemplary and one of ordinary skill in the art, after reading this disclosure, can contemplate alternative sequences of steps that achieve substantially the same result as shown by the sequence of steps for redirect chain 200.

More specifically, an example of redirect chain 200 including multiple redirects to obtain a network resource is illustrated in FIG. 2 starting at step 202 where one of the client devices 14(1)-14(n) (e.g., a mobile device) sends an HTTP request for a network resource at a Uniform Resource Locator (URL) http://www.example.com/A.html, although other types of requests for other types of network resources may be sent. Although in this example one of the client devices 14(1)-14(n) via a web browser requests a page A.html at the website, "www.example.com" as shown, by way of example only, client devices 14(1)-14(n) may send a request for a network shared data file using a file transfer protocol instead of a URL using the HTTP protocol. In one example, this request is transmitted to the proxy server device 12 which processes and transmits the request to the one of the server device 16(1)-16(n) hosting the exemplary website www.example.com.

In step 204, the client device requesting the network resource gets a response from the hosting one of the server devices 16(1)-16(n) storing the network resource, in this example, the requested page A.html. The response includes a temporary redirect message 204a (shown as an exemplary status code 302 with a message "Moved Temporarily") to a different URL 204b. URL 204b is shown exemplarily as http://www.example.com/B.html with a header field 204c shown as "Set-Cookie" including a cookie named "SESSION" set to value "1234," with domain equal to "example.com" and the path equal to "/."

Generally, the cookie is a string formed by the pair "name=value" (e.g., "SESSION=1234", followed by optional attributes, like those in this example indicating the server domain(s) and path accepting this cookie. Although one illustrative example is described herein, this technology can be used with specifications for all cookies.

In step 206, the client device will then send a new HTTP request 206a to the server devices 16(1)-16(n) for a URL http://www.example.com/B.html also passing the cookie 206b shown as "SESSION=1234." In response, at step 208 of the redirect chain 200, the requesting client device obtains a new temporary redirect message 208b to another URL http://www.example.com/C.html with a new cookie named "LANG" set to a value "en" in a header field 208c.

In step 210, since the response at step 208 included a new cookie "LANG" with the new redirect response message 208b to a URL http://www.example.com/C.html, the client device will then send a new HTTP request 210a for http://www.example.com/C.html passing the two cookies "LANG=en" and "SESSION=1234" in a header 210b. In response, in step 212, the client device will get a real network resource 212b as a response from the hosting one of server devices 16(1)-16(n) with a status identifier message 212a shown as status code 200 set to "OK." It is to be noted although steps 202-212 are shown, a higher or a lower number of steps may be realized to obtain the real network resource 212b in response to the initial request in step 202 from one of the client devices 14(1)-14(n) for the network resource A.html by back and forth redirect communications as shown by redirect chain 200 between the client device 14(1)-14(n) and server devices 16(1)-16(n) via proxy server device 12. By way of example only, in some scenarios the client device may never be able to obtain the network resources for various reasons, including non-availability of the resources.

Figure 3:
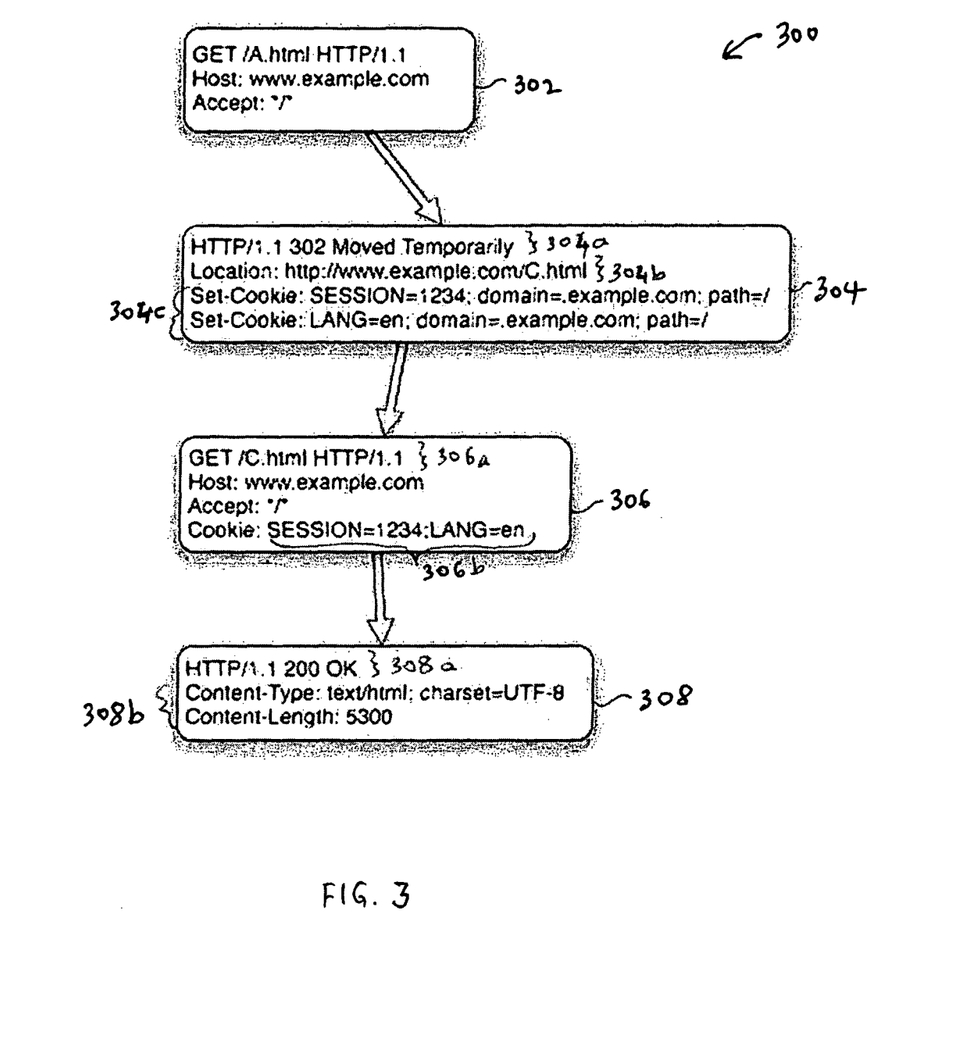
FIG. 3 is an example of an optimized redirect response message chain handled by the proxy server device of FIG. 1 on behalf of client devices of FIG. 1 for obtaining a network resource.

Referring to FIG. 3, an exemplary aspect of the present technology will now be described. FIG. 3 shows an exemplary redirect chain 300 when handled by proxy server device 12 interposed between client devices 14(1)-14(n) and server devices 16(1)-16(n). Advantageously, in this exemplary embodiment, back and forth communication between the client devices 14(1)-14(n) and hosting server devices 16(1)-16(n) with respect to intermediate redirect message portions of redirect chain 300 received for a requested network resource is reduced/minimized or even eliminated, thereby reducing latency in network connection between client devices 14(1)-14(n) and hosting server devices 16(1)-16(n). Redirect chain 300 is handled by proxy server device 12 as illustrated in the sequence of steps shown in FIG. 3 and described below, although the sequence of steps for handling redirect chain 300 is only exemplary and one of ordinary skill in the art, after reading this disclosure, can contemplate alternative sequences of steps that achieve the same, or substantially the same result as shown by the sequence of steps for redirect chain 300.

In step 302, one of client devices 14(1)-14(n) sends an initial request for a URI, e.g., a URL http://www.example.com/A.html to the proxy server device 12. In step 304, unlike steps 204-208 of FIG. 2, proxy server device 12 executes all the intermediate redirects on its side and returns a temporary redirect response message 304a (shown as an exemplary status code 302 with a message "Moved Temporarily") for a URL 304b identified as a URL http://www.example.com/C.html to the requesting one of client devices 14(1)-14(n). In this example, both "LANG" and "SESSION" cookies will be set as shown by respective "Set-Cookie" header fields 304c such that they correspond to the updated state of the requested URL www.example.com. Although a single redirect message is illustrated in FIG. 3, the process can be extended to proxy server device 12 handling all the redirect messages from server devices 14(1)-14(n) until a real resource (e.g., with an HTTP status message 200) is obtained. The information, including cookies, contained in the intermediate or temporary redirect response message 304a is forwarded to the requesting one of client devices 14(1)-14(n). For example, the forwarded message can include merged cookies previously received.

In step 306, the requesting client device will then send a request including a last redirect message 306a from the redirect chain 300 to the proxy server device 12 for the network resource URL http://www.example.com/C.html with updated cookies "SESSION" and "LANG" in the header field 306b as illustrated. The requesting client device forms the last redirect message 306a based upon the information forwarded by proxy server device 12 in step 304, and cookie information stored at the requesting client device because of prior navigation by the requesting client device, although the requesting client device may obtain the updated state of cookies from other sources, for example, one of server devices 16(1)-16(n).

In step 308, in response to the request sent in step 306, the requesting one of the client devices 14(1)-14(n) gets a real network resource 308b as a response from the hosting one of the server devices 16(1)-16(n) with a status identifier 308a set to "OK" (shown as status code 200). Advantageously, the redirect chain 300 is executed substantially between the proxy server device 12 and the hosting one of server devices 16(1)-16(n) in a substantially lesser time as compared to the intermediate redirect responses shown in redirect chain 200 exchanged substantially between the client devices 14(1)-14(n) and the hosting one of server devices 16(1)-16(n) with minimal to zero functionality of proxy server device 12 with respect to handling redirect response message chain 200. This is because typically there is a faster connection between proxy server device 12 and server devices 16(1)-16(n) than between client devices 14(1)-14(n) and server devices 16(1)-16(n).

Figure 4:
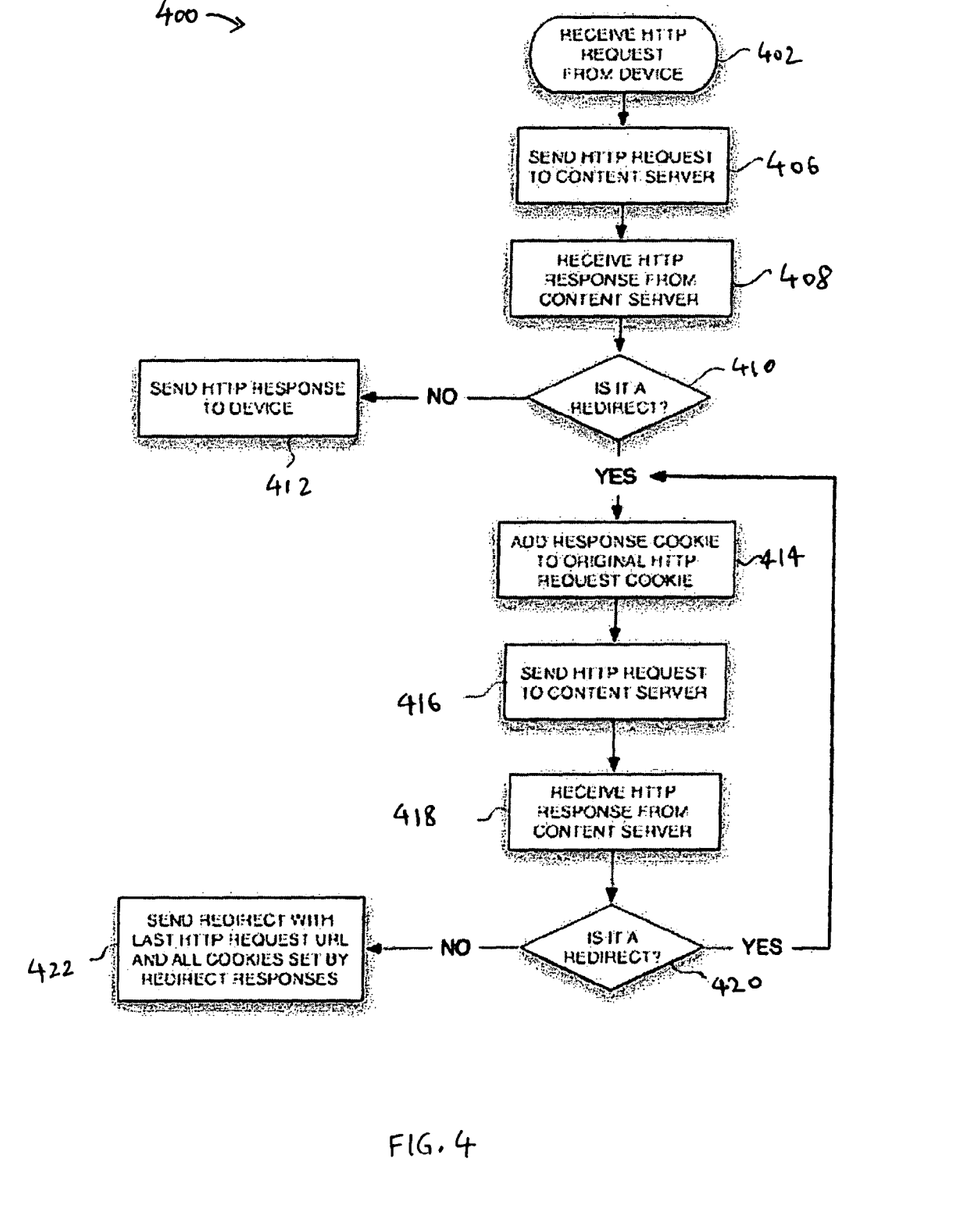
FIG. 4 is an exemplary flowchart for reducing latency in network connections by optimizing redirect response message chains at the proxy server device.

Referring to FIG. 4, an exemplary method for reducing latency in network connections (e.g., HTTP connections) will now be described using a flowchart 400 with reference back to FIGS. 1-3. In this example, an exemplary sequence of steps performed by proxy server device 12 to handle redirects as discussed above is described. The flowchart 300 is representative of example machine readable instructions to implementing reducing latency in network connections, for example, at proxy server device 12. In this example, the machine readable instructions comprise an algorithm for execution by: (a) a processor (e.g., CPU 13), (b) a controller, and/or (c) one or more other suitable processing device(s) within proxy server device 12, for example. The algorithm may be implemented in software stored on tangible computer readable media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or implemented in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, or the like). For example, at least some of the components of the proxy server device 12 could be implemented by software, hardware, and/or firmware. Also, some or all of the machine readable instructions represented by the process of flowchart 400 of FIG. 4 may be implemented manually at the proxy server device 12, for example, using a command line interface (CLI) prompt window operated by a system administrator. Further, although the example algorithm is described with reference to flowchart 400, persons of ordinary skill in the art will readily appreciate that many other methods of implementing the example machine readable instructions may alternatively be used. For example, the order of execution of the blocks in flowchart 400 may be changed, and/or some of the blocks described may be changed, eliminated, or combined.

The flow begins in step 402, when proxy server device 12 receives a request from one of the client devices 14(1)-14(n). By way of example only, the request can be an HTTP request, although other types of requests (e.g., any type of HxxP or HTTPS request). In step 406, the received request is processed by proxy server device 12 and forwarded to one of the content hosting server devices 16(1)-16(n) based upon the information in the request. In response, in step 408, proxy server device 12 receives a first response from the hosting one of the server devices 16(1)-16(n), the first response being formed based upon the information in the forwarded request received by the hosting one of server devices 16(1)-16(n). In step 410, proxy server device 12 determines whether the response from the hosting one of server devices 16(1)-16(n) is a real network resource (e.g., a status code 200 message) or a redirect message. If a real resource is received, the Yes branch is followed to step 412, where proxy server device 12 sends the first response including the link to the actual network resource to the requesting client device.

However, as shown in step 414, if the first response from the hosting one of the server devices 16(1)-16(n) is not a real network resource but is a redirect message (for example, a temporary redirect 204a with status code 302, shown in FIG. 2), proxy server device 12 will collect the cookies set in the first response and merge them with those sent with the last and/or prior requests for the network resource, including the original cookie received by the proxy server device 12 from the hosting one of the server devices 16(1)-16(n).

In step 416, proxy server device 12 will then send a new request (or, a second request) for the network resource (e.g., URL "www.example.com/C.html") specified in the last redirect response (e.g., redirect message 306a) to the hosting one of the server devices 16(1)-16(n), passing the cookies used in the first request (shown in step 302 of FIG. 3) and all the cookies collected from the previous redirect response messages 304a, 306a. It is to be noted the proxy server device 12 does not send the redirect messages that do not include real network resource to the client devices 14(1)-14(n). In step 418, proxy server device 12 receives a response back from the hosting one of server devices 16(1)-16(n), which response is examined again, similar to step 410. In step 420, if the response from the hosting one of server devices 16(1)-16(n) is again a redirect message (e.g., redirect message 306a), then the proxy server device 12 will continue to repeat steps 414-418 by subsequently creating a new request for the server devices 16(1)-16(n) based upon the last redirect response message obtained from server devices 16(1)-16(n). Using the technique discussed above, instead of the requesting one of client devices 14(1)-14(n) handling all intermediate redirect messages from server devices 14(1)-104(n), proxy server device 12 is configured to handle the intermediate redirects until a real network resource is obtained from server devices 16(1)-16(n). An advantage of the proxy server device 12 handling the redirect message chain instead of client devices 14(1)-14(n) is to reduce latency in provisioning requests from client devices 14(1)-14(n) since connection between proxy server device 12 and server devices 16(1)-16(n) is faster than connection between client devices 14(1)-14(n) and server devices 16(1)-16(n).

However, if the response from the hosting one of server devices 16(1)-16(n) is a real network resource, in step 422, proxy server device 12 will send a redirect response 304a to the requesting one of the client devices 14(1)-14(n) specifying the last URL 304b of the redirect chain 300 and all the cookies (e.g., cookies in header field 306b) collected from the redirect response messages 304a, 306a. Subsequently, the requesting one of the client devices 14(1)-14(n) can use the most updated URL 304b to the hosting one of the server devices 16(1)-16(n) via proxy server device 12, and receive the requested network resource. It is to be noted although in the examples above, URLs are being discussed, the technology works in substantially the same manner for other types of resource identifier schemes, e.g., Uniform Resource Names (URNs), as URLs are being discussed by way of example only and not by way of limitation, as can be contemplated by one of ordinary skill in the art after reading this disclosure. Accordingly, the steps shown in flowchart 400 advantageously reduce the slow communication of intermediate redirect response messages between the client devices 14(1)-14(n) and the hosting server devices 16(1)-16(n), thus reducing latency in the network connection, which in this example is an HTTP connection, although other types of connections (e.g., FTP connections) may be used.

Accordingly, as illustrated and described herein this technology provides a number of advantages including providing a method, computer readable medium and an apparatus that reduces latency in network connections, for example, by managing handling of redirect messages from server devices 16(1)-16(n) substantially at proxy server device 12 interposed between the client devices 14(1)-14(n) and server devices 16(1)-16(n) on which various network resources are stored, which network resources are requested by client devices 14(1)-14(n). With this technology, the proxy server device 12 optimizes network resource provisioning by returning only the last redirect message along with all cookies collected from intermediate redirect messages from a chain of redirect messages from server devices 16(1)-16(n) to client devices 14(1)-14(n) for a particular network resource, thereby reducing latency in network connections between client devices and server devices.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for reducing latency in network connections, the method comprising:
   receiving by a proxy server device a response from one or more server devices in response to a request from a client device for a network resource stored on the one or more server devices;
   sending another request from the proxy server device to the one or more server devices without providing the response to the client device, wherein the sending is performed at least partially based upon a network address indicated in a redirect message included in the response and the other request includes one or more cookies included in the response merged with one or more other cookies received in one or more prior responses;
   repeating by the proxy server device the receiving and sending until the response is determined to include the network resource;
   sending by the proxy server device the redirect message including the network address to the client device along with the one or more cookies and the one or more other cookies included in the response when the response is determined to include the network resource; and
   receiving by the proxy server device, subsequent to sending the redirect message to the client device, an additional request from the client device, the additional request identifying the network resource based on the network address included in the redirect message.

2. The method as set forth in claim 1 further comprising:
   forwarding by the proxy server device the additional request to the one or more server devices based on the network address identified in the additional request;
   receiving by the proxy server device an additional response from the one or more server devices, the additional response including the network resource; and
   sending by the proxy server device the received network resource to the client device.

3. The method as set forth in claim 1, wherein the network address is one of a Uniform Resource Identifier (URI), a Uniform Resource Locator (URL), or a Uniform Resource Name (URN).

4. The method as set forth in claim 1, wherein the client device is a mobile client device.

5. A non-transitory computer readable medium having stored thereon instructions for reducing latency in network connections comprises machine executable code which when executed by at least one processor, causes the processor to perform steps comprising:
   receiving a response from one or more server devices in response to a request from a client device for a network resource stored on the one or more server devices;
   sending another request to the one or more server devices without providing the response to the client device, wherein the sending is performed at least partially based upon a network address indicated in a redirect message included in the response and the other request includes one or more cookies included in the response merged with one or more other cookies received in one or more prior responses;
   repeating the receiving and sending until the response is determined to include the network resource;
   sending the redirect message including the network address to the client device along with the one or more cookies and the one or more other cookies included in the response when the response is determined to include the network resource; and
   receiving, subsequent to sending the redirect message to the client device, an additional request from the client device, the additional request identifying the network resource based on the network address included in the redirect message.

6. The medium as set forth in claim 5, wherein the machine executable code which when executed by at least one processor, causes the processor to further perform steps further comprising:
   forwarding the additional request to the one or more server devices based on the network address identified in the additional request;
   receiving an additional response from the one or more server devices, the additional response including the network resource; and
   sending the received network resource to the client device.

7. The medium as set forth in claim 5, wherein the network address is one of a Uniform Resource Identifier (URI), a Uniform Resource Locator (URL), or a Uniform Resource Name (URN).

8. The medium as set forth in claim 5, wherein the client device is a mobile client device.

9. A proxy server apparatus comprising one or more processors and a memory coupled to the one or more processors which are configured to execute programmed instructions stored in the memory comprising:
   receiving a response from one or more server devices in response to a request from a client device for a network resource stored on the one or more server devices;
   sending another request to the one or more server devices without providing the response to the client device, wherein the sending is performed at least partially based upon a network address indicated in a redirect message included in the response and the other request includes one or more cookies included in the response merged with one or more other cookies received in one or more prior responses;

repeating the receiving and sending until the response is determined to include the network resource;

sending the redirect message including the network address to the client device along with the one or more cookies and the one or more other cookies included in the response when the response is determined to include the network resource; and receiving, subsequent to sending the redirect message to the client device, an additional request from the client device, the additional request identifying the network resource based on the network address included in the redirect message.

10. The apparatus as set forth in claim 9, wherein the one or more processors are further configured to execute programmed instructions stored in the memory further comprising:

forwarding the additional request to the one or more server devices based on the network address identified in the additional request;

receiving an additional response from the one or more server devices, the additional response including the network resource; and sending the received network resource to the client device.

11. The apparatus as set forth in claim 9, wherein the network address is one of a Uniform Resource Identifier (URI), a Uniform Resource Locator (URL), or a Uniform Resource Name (URN).

12. The apparatus as set forth in claim 9, wherein the client device is a mobile client device.

\* \* \* \* \*